US006873979B2

(12) United States Patent
Fishman et al.

(10) Patent No.: US 6,873,979 B2
(45) Date of Patent: Mar. 29, 2005

(54) METHOD OF BUILDING PREDICTIVE MODELS ON TRANSACTIONAL DATA

(75) Inventors: Vladimir Fishman, Farmington, CT (US); Yuri Galperin, Reston, VA (US); Anatoly Reynberg, Hartford, CT (US)

(73) Assignee: Marketswitch Corporation, Dulles, VA (US)

( * ) Notice: Subject to any disclaimer, the term of this patent is extended or adjusted under 35 U.S.C. 154(b) by 668 days.

(21) Appl. No.: 09/795,224

(22) Filed: Feb. 28, 2001

(65) Prior Publication Data

US 2001/0037321 A1 Nov. 1, 2001

Related U.S. Application Data

(60) Provisional application No. 60/185,638, filed on Feb. 29, 2000.

(51) Int. Cl.$^7$ .............................................. G06F 15/18
(52) U.S. Cl. ....................................................... 706/21
(58) Field of Search ........................ 706/15–44; 705/35; 707/1, 3; 709/200

(56) References Cited

U.S. PATENT DOCUMENTS

| | | | | |
|---|---|---|---|---|
| 5,521,813 | A | * | 5/1996 | Fox et al. ........................ 705/8 |
| 5,822,751 | A | * | 10/1998 | Gray et al. ..................... 707/3 |
| 5,912,839 | A | * | 6/1999 | Ovshinsky et al. ..... 365/185.03 |
| 5,926,800 | A | * | 7/1999 | Baronowski et al. ......... 705/35 |
| 6,018,723 | A | * | 1/2000 | Siegel et al. ................... 705/38 |
| 6,029,139 | A | * | 2/2000 | Cunningham et al. ........ 705/10 |
| 6,182,060 | B1 | * | 1/2001 | Hedgcock et al. ............. 707/1 |
| 6,182,080 | B1 | * | 1/2001 | Clements ..................... 707/102 |
| 6,321,205 | B1 | * | 11/2001 | Eder ............................... 705/7 |
| 6,393,406 | B1 | * | 5/2002 | Eder ............................... 705/7 |
| 6,424,956 | B1 | * | 7/2002 | Werbos ........................ 706/2 |
| 6,493,742 | B1 | * | 12/2002 | Holland et al. ............. 709/200 |
| 6,598,030 | B1 | * | 7/2003 | Siegel et al. .................. 705/38 |
| 6,606,744 | B1 | * | 8/2003 | Mikurak ...................... 717/174 |
| 6,671,818 | B1 | * | 12/2003 | Mikurak ......................... 714/4 |
| 2002/0147695 | A1 | * | 10/2002 | Khedkar et al. .............. 706/15 |

OTHER PUBLICATIONS

Parallel granular neural networks for fast credit card fraud detection Syeda, M.; Yan–Qing Zhang; Yi Pan; Fuzzy Systems, 2002. FUZZ–IEEE'02. Proceedings of the 2002 IEEE International Conference on, vol.:1, May 12–17, 2002 pp.:572–577.*

CARDWATCH: a neural network based database mining system for credit card fraud detectionAleskerov, E.; Freisleben, B.; Rao, B.; Computational Intelligence for Financial Engineering (CIFEr), Proceedings of the IEEE/IAFE 1997, p.:220–226.*

Neural data mining for credit card fraud detection Brause, R.; Langsdorf, T.; Hepp, M.; Tools with Artificial Intelligence, 1999. Proceedings. 11th IEEE International Conference on, Nov. 9–11, 1999 pp.:103–106.*

(Continued)

*Primary Examiner*—Anthony Knight
*Assistant Examiner*—Michael B. Holmes
(74) *Attorney, Agent, or Firm*—Jerold I. Schneider; DLA Piper Rudnick Gray Cary US LLP

(57) ABSTRACT

A method of building predictive statistical models provides a dedicated aggregation module for each transactional record source. Each aggregation module aggregates the transactional records using a neural network function to produce a scalar output which can then be input to a traditional modeling function, which may employ either logistic regression, neural network, or radial basis function techniques. The output of the aggregation modules can be saved, and updated aggregation values can be updated by processing new transaction records and combining the new transaction values with the previous output values using a blending function. Parameters of the neural network in the aggregation module may be calculated simultaneously with the parameters of the traditional modeling module.

13 Claims, 4 Drawing Sheets

OTHER PUBLICATIONS

Market basket analysis of library circulation data Cunningham, S.J.; Frank, E.; Neural Information Processing, 1999. Proceedings. ICONIP '99. 6th International Conference on, vol.: 2, Nov. 16–20 1999 pp.:825–830 vol.2.*

Data mining techniques for optimizing inventories for electronic commerce, Anjali Dhond, Amar Gupta, Sanjeev Vadhavkar, Proceedings of the sixth ACM SIGKDD international conference on Knowledge discovery and data mining table, 2000, pp.: 480–486.*

Applying associative retrieval techniques to alleviate the sparsity problem in collaborative filtering, Zan Huang, Hsinchun Chen, Daniel Zeng, ACM Transactions on Information Systems (TOIS), 2004, pp.: 116–142.*

Fuhr, N. and Pfeifer, U., Probabilistic Information Retrieval as a Combination of Abstraction, Inductive Learning, and Probabilistic Assumptions, Jan. 1994, ACM Transactions on Information Systems, vol. 12 pp. 92–115.*

Johnson, A., et al., "Improved compilation of Antarctic Peninsula magnetic data by new interactive grid suturing and blending methods", British Antarctic Survey, undated.

Dekkers, D., et al., "Combining CSG modeling with soft blending using Lipschitz–based implicit surfaces", Primitive and Compound Objects, 1996.

"The Modified Shepard's Blending Method", www.cs.sunysb.edu/~xhui/MyPublications/surface–reconstruct–html/node4.html, undated.

New View Synthesis:, www–2.cs.cmu.edu/~gitars/16–721/week11/week11.html, undated.

Hirokawa, N., et al., "Voronoi Diagram Based Blending of Quadratic Response Surfaces for Cumulative Global Optimization", American Institute of Aeronautics and Astronautics, undated.

Samareh, J., et al., Application of Quaternions for Mesh Deformation, NASA/TM–2002–211646, Apr. 2002.

Reutter, B.W., et al., "Computationally Efficient Nonlinear Edge Preserving Smoothing of n–D Medical Images Via Scale–Space Fingerprinting Analysis", IEEE Nuclear Science Symposium and Medical Imagine Conference, pp. 15/286, 2000.

Pasko, G., et al., Space–time bending, undated.

* cited by examiner

METHOD OF BUILDING PREDICTIVE MODELS ON TRANSACTIONAL DATA

RELATIONSHIP TO PRIOR APPLICATIONS

This application claims priority under 35 U.S.C. §119(e) from U.S. Provisional Application Ser. No. 60/185,638, filed Feb. 29, 2000, herein incorporated by reference.

FIELD OF THE INVENTION

This invention relates to the development of predictive statistical models based on transactional data. More specifically, this invention develops predictive models directly based on any number of heterogeneous sets of transactional records.

BACKGROUND OF THE INVENTION

Predictive statistical models are built based on the prior observations of the variable that the model is supposed to predict. The variable is called the output variable. The known data about observation is called the set of input variables; these variables are used as an input to the model when it is developed. Traditional methods for developing predictive statistical models, including logistic regression, neural network, radial basis function and others, can only accept input as an array of scalar numbers. For example, a model that predicts customer response to a marketing offer has a probability to respond as an output variable and may have age, income, marital status and gender as input variables.

However, in the real world, information about a customer is not limited to the array of scalar values. In addition to the above-mentioned input variables, transactional data such as a customer purchase history may be available to a modeler. The purchase history is a set of records that may include, for example, date of the purchase, dollar amount and category of a product purchased. Each customer may have one or several records in the purchase history or no records at all. The number of records varies from customer to customer. Moreover, there may be several transactional sources of data available simultaneously. For example, in addition to the purchase history, coupon usage history may include date, coupon type and coupon amount.

The importance of transactional data has greatly increased over the last several years with the invention of the Internet. Each web site typically collects a log that records customer visits to a web site, advertisements seen, and responses to these advertisements. The amount of this valuable marketing information is enormous and it is highly desirable to utilize it.

Traditional modeling methods cannot use transactional information directly. Instead, if the transactional data is available, it is a responsibility of the modeler to aggregate this data first. That means that modeler must derive a set of scalar variables from each transactional source of data. In case of purchase history it may be total number of purchases and average amount of a purchase. Data aggregation is a manual, time-consuming and arbitrary process. There is no known scientific method that tells a modeler what exactly the attributes should be derived. In the above-mentioned example, the number of purchases in the last 6 months may be a better predictor than the total number of purchases. A modeler therefore must use intuition and experience to decide what attributes to derive. Since the process is manual, it is usually very time-consuming. Also, a simple human error can nullify all the further efforts of developing the model. Another drawback of traditional method is that when transactional information is updated the whole process of aggregation needs to be repeated.

What would be really be useful is a method of developing a model that can accept several transactional sources of data directly, without requiring a manual aggregation step and that can provide an efficient way to handle updated transactional data.

SUMMARY OF THE INVENTION

The present invention is drawn to method of building predictive statistical models based on transactional data utilizing a set of aggregation modules that are followed by a traditional module that implements logistic regression, neural networks or radial basis functions technology. The present invention therefore makes it possible to use a heterogeneous mix of a number of transactional data sources as model input in addition to a traditional array of scalar attributes. Each transactional source is processed by a dedicated aggregation module. The output of each aggregation module is an array of scalar numbers that can be used as an input to the traditional modeling module. The output of aggregation modules can be saved so when the new transactional records become available the output of the model can be updated just by processing these new records only. Parameters of the aggregation module are calculated simultaneously with the parameters of the traditional module during model training.

It is an object of the present invention to provide a method of transactional data modeling wherein the weights can be computed by a simple recurrent procedure such that gradient methods can be applied for training.

It is an object of the present invention to provide transactional data modeling wherein the model output is reusable so that as new transaction data becomes available, customer output scores can be updated in a single pass using the same model.

It is an object of the present invention to provide transactional data modeling that is adjustable such that when the model is used for scoring, it can be retrained off-line without changing its structure and interrupting the scoring process.

DETAILED DESCRIPTION OF THE INVENTION

The present invention provides a method of developing a model that (i) can accept several transactional sources of data directly, without requiring a manual aggregation step, and (ii) can provide an efficient way to handle updated transactional data.

In practicing the present invention, it is assumed that one desires to build a predictive statistical model for the output variable X. For each observation $X_j$, one knows a set of input variables $$\{S, T_1, T_2, \ldots, T_n\}$$

where $S=(s_1, s_2, \ldots, s_{m_0})$—array of scalar values;

$$T_i = \begin{pmatrix} t^i_{11} & \cdots & t^i_{1m_i} \\ t^i_{21} & \cdots & t^i_{2m_i} \\ t^i_{r^j_i 1} & \cdots & t^i_{r^j_i m_i} \end{pmatrix};$$

$i = 1, \ldots n$ – set of $n$ transactional sources of data.

Figure 1:
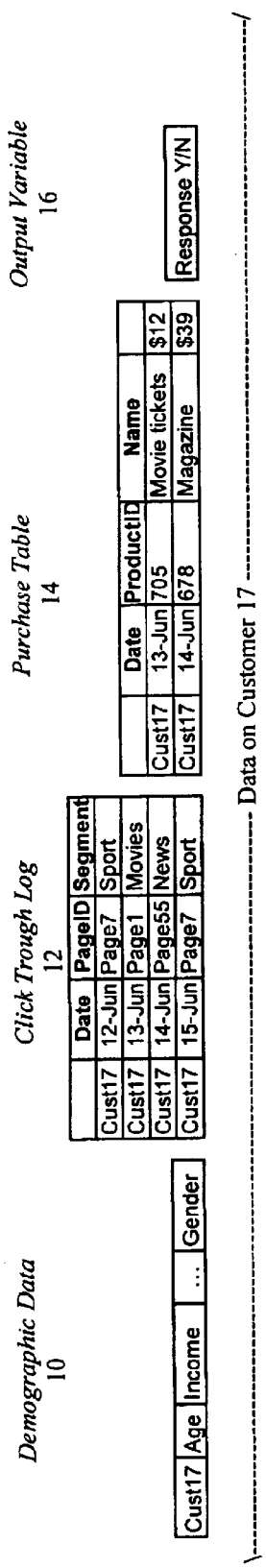
FIG. 1 illustrates a sample of customer transaction data tables useful for the present invention.

Each transactional source i has $m_t$ attributes, and contain $r_i^j$ records for the observations j. It is important that the number of attributes in each transactional source is the same for all observation, but the number of records varies from observation to observation. An example of the input data of the above structure for one observation is shown in FIG. 1.

In this example, one is building a predictive model of customer response to a Vacation Package offer on the eCommerce web site. The output variable (i.e., X) at 16 is a probability of responding to the offer. Observations are actual historical responses of different customers to the Vacation Package offer. Input variables come from three sources of data. The first source is a traditional array of demographic customer data 10 that contains customer age, income, gender and other elements.

The second source of data is a web site click-through log 12, where the information about customer clicks on different advertisements is recorded. This source has three variables: date of click-through, web page where the advertisement was located and the segment to which the advertisement belongs. In the example of FIG. 1, Customer 17 clicked on four advertisements on different pages prior to responding to the Vacation Package offer.

The third source is a table in the relational database that contains a customer purchase history from purchase table 14. In the example, Customer 17 made two purchases on the web site: movie tickets and magazine subscription prior to responding to the Vacation Package offer.

Figure 2:
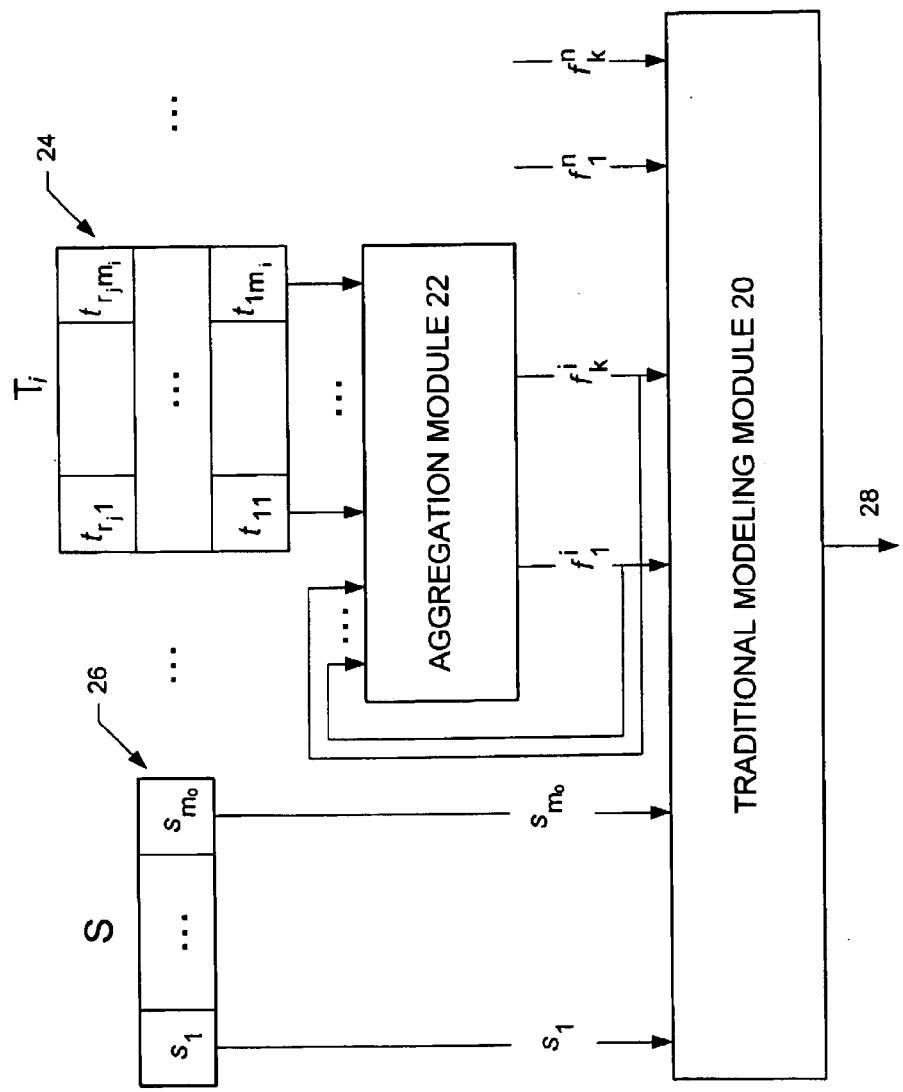
FIG. 2 illustrates a model structure with the aggregation module of the present invention.

The general structure of the model in the present invention is shown in FIG. 2. Each transactional source of data (i.e., $T_i$) 24 is processed separately by a dedicated aggregation module 22 that represents a simple neural network. The module outputs are used as a feedback and are updated with each new transactional record. All aggregation module outputs combined with the traditional array of scalar inputs 26 are used as input attributes for the traditional modeling module 20 that implements logistic regression, neural networks or radial basis functions technology.

Figure 3:
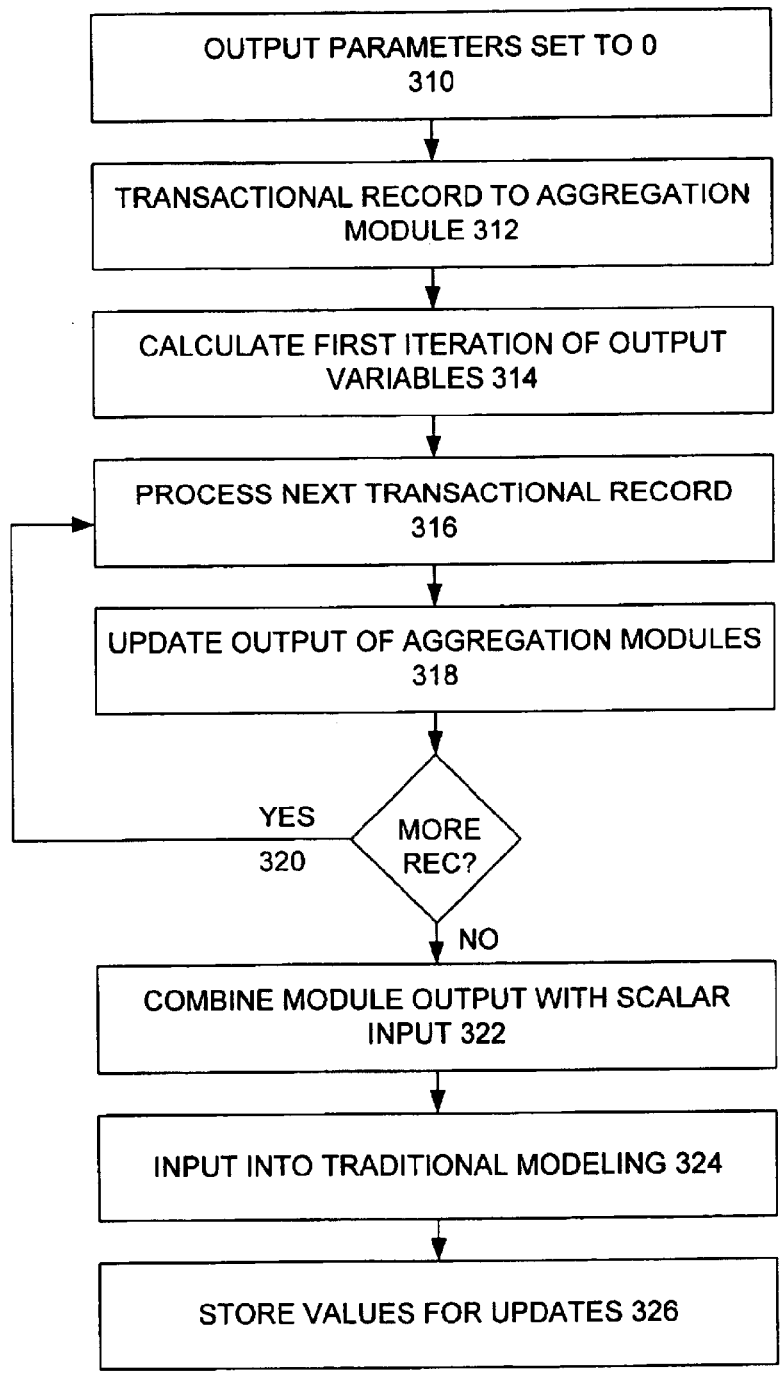
FIG. 3 illustrates an algorithm to calculate the output of the model in accordance with the present invention.

As illustrated in FIG. 3, the algorithm to calculate the output of the model is as follows:
1. Output parameters of each aggregation module are set equal to 0, at 310.
2. The first transactional record of each source goes to the corresponding aggregation module, at 312.
3. First iteration of the output variables of each aggregation module are calculated 314 as:

$$f_k^i(1)=F(\phi(\Sigma t_{pq}w_i^m),0)$$

4. Next transactional record is processed 316 and the outputs of the aggregation modules are updated 318 as:

$$f_k^i(r+1)=F(\phi(\Sigma t_{pq}w_i^m),f_k^i(r))$$

5. Step 4 is repeated 320 until all records are processed.
6. Accumulated values of $f_k^i$ are combined with the traditional array of scalar inputs S 322 and are used as input attributes for the traditional modeling module 324. These values may be stored for quick model output updates 326 (see below).
7. Output of the model is calculated in the traditional modeling module 328.

In the above algorithm:
$\phi$—neural network element function;
F—blending function that controls how fast the previous transactional records become obsolete;
$w_i^m$—weights of the neural network.

Figure 4:
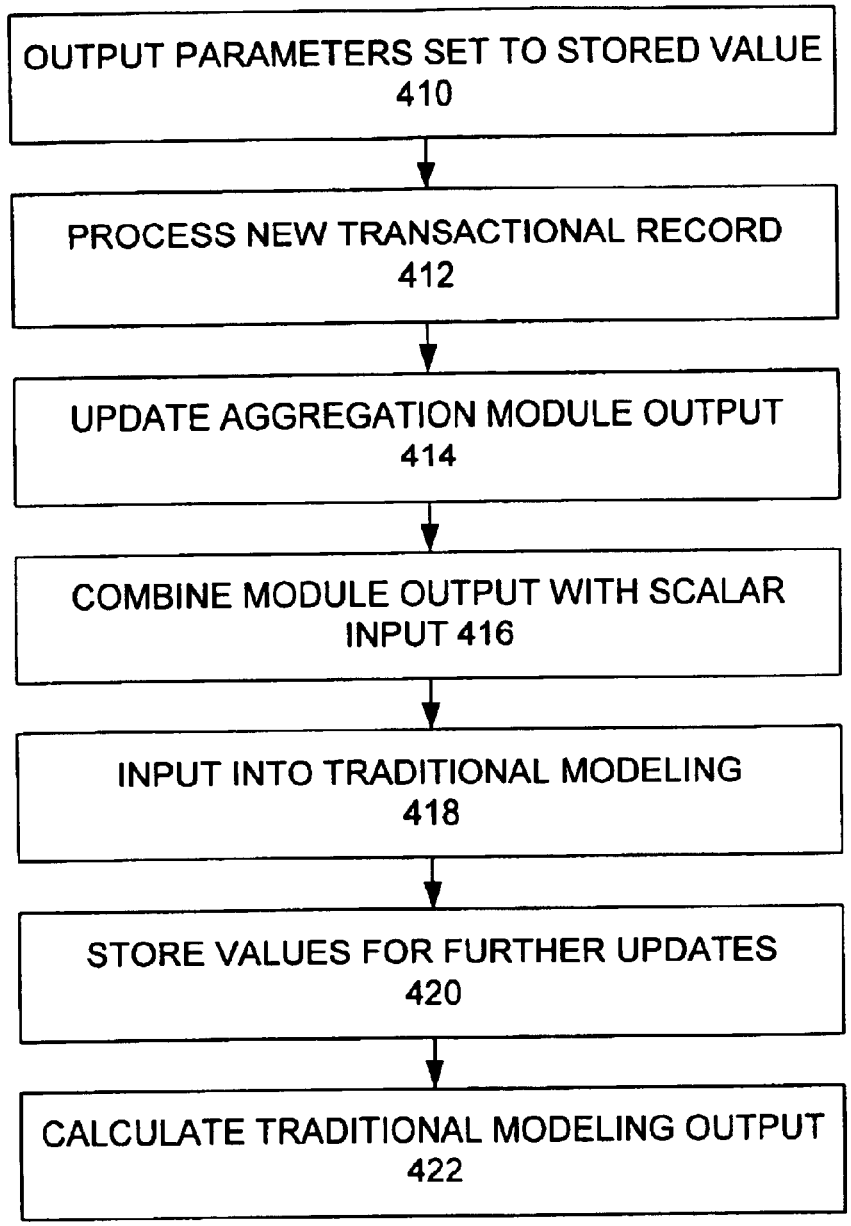
FIG. 4 illustrates an algorithm for quickly updating output of the model in accordance with the present invention.

When a new transactional record becomes available, the output of the model can be quickly updated, as illustrated in FIG. 4, using the following algorithm:
1. Output parameters of each aggregation module are set equal to previously stored values $f_k^i$ at 410.
2. The new transactional record is processed 412 and the outputs of the corresponding aggregation module is updated 414 as $$f_k^i=F(\phi(\Sigma t_{pq}w_i^m),f_k^i)$$

3. New values of $f_k^i$ are combined with the traditional array of scalar inputs S 416 and are used as input attributes for the traditional modeling module 418. These values may be stored again 420 for further model output updates.
4. Output of the model is calculated in the traditional modeling module 422.

Parameters of the aggregation module are calculated simultaneously with the parameters of the traditional module during model training using traditional methods, like back propagation, in a straightforward manner.

Although disclosed with reference to specific embodiments, it will be appreciated by those skilled in the art that other embodiments of the present invention are possible without departing from the scope of the invention as defined by the following claims.

We claim:

1. A method of building predictive models on transactional data, comprising:

providing an aggregation module for each transactional record source;

initializing output values of each aggregation module;

inputting a first transactional record from each transactional record source into said corresponding aggregation module;

calculating a first iteration of said output values for each aggregation module as:

$$f_k^i(1)=F(\varnothing(\Sigma t_{pq}w_i^m),0),$$

where:
$\phi$ is a neural network element function;
F is a blending function that controls how fast a previous
transactional record become obsolete; and
$W_i^m$ are weights of the neural network;

inputting a next transactional record from each transactional record source into said corresponding aggregation module;

updating said outputs values of each aggregation module as:

$$f_k^i(r+1)=F(\varnothing(\Sigma t_{pq}w_i^m),f_k^i(r));$$

repeating the two prior steps until all transactional records are processed; and obtaining scalar values $f_k^i$ as scalar inputs for traditional modeling.

2. The method of building predictive models on transactional data of claim 1, further comprising storing output values $f_k^i$.

3. The method of building predictive models on transactional data of claim 1, further comprising:

combining accumulated values of $f_k^i$ with a traditional array of scalar inputs S as input attributes and;

using said input attributes in a traditional modeling module.

4. The method of building predictive models on transactional data of claim 3, further comprising selecting said traditional modeling module from the group consisting of logistic regression models, neural networks and radial basis function models.

5. The method of building predictive models on transactional data of claim 2, further comprising updating output values of each aggregation module in response to new transactional data by:

setting output values of each aggregation module equal to previously stored values $f_k^i$;

inputting a new transactional record from each transactional record source into said corresponding aggregation module;

updating said outputs values of each aggregation module as:

$$f_k^i = F(\emptyset(\Sigma t_{pq} w_i^m), f_k^i)$$

repeating the two prior steps until all new transactional records are processed; and obtaining scalar values $f_k^i$ as scalar inputs for traditional modeling.

6. The method of building predictive models on transactional data of claim 5, further comprising staring output values $f_k^i$.

7. The method of building predictive models on transactional data of claim 5, further comprising:

combining accumulated values of $f_k^i$ with a traditional array of scalar inputs S as input attributes and;

using said input attributes in a traditional modeling module.

8. The method of building predictive models on transactional data of claim 7, further comprising selecting said traditional modeling module from the group consisting of logistic regression models, neural networks and radial basis function models.

9. A method for predicting a response to an offer comprising the steps of:

aggregating first transaction records from a first transaction source using a first aggregation module to produce a set of first output variables, the first transaction records corresponding to a plurality of customers, each of the first transaction records having a first number of attributes, a number of first transaction records associated with each customer varying from customer to customer, the first aggregation module comprising a neural network that weights the attributes from the first transaction records to produce the first output variables using a first set of aggregation weights;

aggregating second transaction records from a second transaction source using a second aggregation module to produce a set of second output variables, the second transaction records corresponding to a plurality of customers, each of the second transaction records having a second number of attributes, a number of second transaction records associated with each customer varying from customer to customer, the second aggregation module comprising a neural network that weights the attributes from the second transaction records to produce the second output variables using a second set of aggregation weights;

inputting the first output variables and the second output variables to a traditional modeling module;

inputting scalar variables into the traditional modeling module;

calculating, by the traditional modeling module, a predicted response to an offer; and determining whether to make the offer based on predicted response.

10. The method of claim 9, wherein the traditional modeling module calculates the predicted response using a technique selected from the group consisting of logistic regression, neural network, and radial basis function.

11. The method of claim 9, further comprising the step of calculating the first aggregation weights and the second aggregation weights using a back propagation method.

12. The method of claim 11, wherein the first aggregation weights and the second aggregation weights and parameters of the traditional modeling module are calculated simultaneously.

13. The method of claim 9, further comprising the step of updating at least either the first output variables or the second output variable based on new transaction data according to the following formula:

$$f_k^i(r=1) = F(\emptyset(\Sigma_{pq} {}^i w_i^m), f_k^i(r))$$

where $\phi$ is a neural network element function;

F is a blending function that controls how fast a previous transactional record become obsolete; an $w_i^m$ are weights of the neural network of the aggregation module corresponding to the new transaction data.

* * * * *